United States Patent [19]

Goel et al.

[11] Patent Number: 4,863,525

[45] Date of Patent: Sep. 5, 1989

[54] FLUSH SOLVENTS FOR EPOXY ADHESIVES

[75] Inventors: Anil B. Goel, Worthington; Jeffrey P. Jones, Columbus, both of Ohio

[73] Assignee: Ashland Oil, Inc, Ashland, Ky.

[21] Appl. No.: 930,206

[22] Filed: Nov. 13, 1986

[51] Int. Cl.$^4$ ............................................. B08B 3/08
[52] U.S. Cl. .............................. 134/22.19; 134/22.14; 134/38; 252/153; 252/170; 252/364; 252/542; 528/491
[58] Field of Search ................. 134/22.14, 22.19, 38; 528/491; 252/DIG. 8, 153, 170, 364, 542

[56] References Cited

U.S. PATENT DOCUMENTS

| | | | |
|---|---|---|---|
| 1,878,102 | 9/1932 | Bradley | 252/170 |
| 3,099,584 | 7/1963 | Walsh | 134/38 X |
| 3,150,121 | 9/1964 | Quarles et al. | 528/491 |
| 3,954,648 | 5/1976 | Belcak et al. | 252/170 X |
| 4,168,989 | 9/1979 | Edelman et al. | 252/170 X |
| 4,287,003 | 9/1981 | Allen | 252/153 X |
| 4,543,206 | 9/1985 | Adams | 252/364 X |
| 4,578,424 | 3/1986 | Goel | 525/109 |
| 4,606,840 | 8/1986 | Gantier et al. | 252/170 X |

FOREIGN PATENT DOCUMENTS

| | | | |
|---|---|---|---|
| 47-65245 | 3/1974 | Japan | 252/364 |
| 58-174456 | 10/1983 | Japan | 252/364 |
| 2033422A | 5/1980 | United Kingdom | 252/170 |

OTHER PUBLICATIONS

Handbook of Epoxy Resins, Lee et al., New York, et al., McGraw Hill Book Co. Copyright 1967, Lib of Cong. #65-26165, pp. 24-33.

*Primary Examiner*—Asok Pal
*Attorney, Agent, or Firm*—John F. Jones

[57] ABSTRACT

A process for removing epoxy resin adhesive and coating agent residues from surfaces of apparatus containers and other surfaces which come in contact with such adhesives and coating agents during their preparation and use comprising contact said residues with a flushing agent which comprises at least one ester of a carboxylic acid having the formula $R(COOR')_n$ wherein R represents a hydrocarbon group having from 1 to 10 carbon atoms, R' represents an aliphatic hydrocarbon group having from 1 to 4 carbon atoms and n represents a whole number of from 1 to 2 is described.

6 Claims, No Drawings

FLUSH SOLVENTS FOR EPOXY ADHESIVES

The present invention relates to a process for removing epoxy adhesive and coating residues from apparatus and containers and other surfaces used in the preparation, dispensing and curing of the adhesive and more particularly relates to the process whereby epoxy adhesive residues are removed from such apparatus and containers, etc. by means of certain carboxylic acid esters such as the dimethyl esters of succinic acid, glutaric acid, and adipic acid.

We have discovered that certain esters of carboxylic acids, particularly the esters of dibasic acids such as succinic acid, glutaric acid and adipic acid, can be used efficiently as flush solvents for removing the residues of epoxy adhesives from various surfaces to which they have become adhered during the preparation, processing and use of such adhesives. This process is particularly applicable to epoxy adhesive residues which result from mixed two component epoxy adhesives based on an epoxy resin component and an amine/amido amine hardener component. Such epoxy adhesives can be readily dispersed/dissolved in the carboxylic acid ester solvents of this invention and thus the adhesive use and dispensing parts such as mixing heads, static mixers, molds and the like can be cleaned/flushed free of adhesive residues prior to the permanent gelation of the adhesive.

The ambient temperature pot life of the mixed two component epoxy adhesives (epoxy resin component and hardener component) vary from a few minutes to several hours, depending upon the types of curing agents used in the hardener component. The viscosities of these mixed epoxy adhesives increases with time, and eventually, the adhesive gels to give an infusible thermoset polymeric product with time. In order to clean the adhesive prior to its gelation, a solvent flushing process is usually used. The most commonly used solvents in the prior art epoxy adhesive application industry are halocarbon solvents and particularly methylene chloride because of its excellent solubility and epoxy adhesive dispersing properties. Methylene chloride and other halogenated hydrocarbons have been found to be extremely toxic and are pollutants of the atmosphere and because of this are being banned from the work place as hazardous materials. The use of dibasic acid esters of the types embodied in the present invention as flushing solvents for epoxy resin residues has not previously been reported. The flushing agents of the present invention are of relatively low volatility, can be recycled and have no known toxic properties and thus they can be used safely in the work place.

In industrial epoxy adhesive applications, the two components of the adhesives are generally mixed in mixing devices, such as static mixers, and the mixed adhesive is applied on the substrates through a dispensing tube or similar device. The two component industrial epoxy adhesives composed of an epoxy resin component and an amine/amido amine hardener component, generally have ambient temperature pot life (open time) varying from a few minutes to a few hours, depending on the type of curing agents used in the hardener component. The fast curing adhesives at moderately elevated temperatures usually show short room temperature pot life (open time). Generally, in industrial applications, the adhesive dispensing is not continuous and there is usually a time gap between the adhesive application from one part to another. Thus, the mixed adhesive, having shorter open time, needs to be cleaned from the mixer and also from the dispensing tube or apparatus prior to the occurrence of gelation. For such cleaning operation which is usually referred to as flushing, a solvent having excellent solubility and dispersability property towards the mixed adhesive is required. The commonly used methylene chloride solvent for this purpose as stated above has been found to be toxic and must be replaced. There is a definite need for a non-toxic, low viscosity and high boiling solvent for use in the epoxy adhesive flushing process and the process of this invention fulfills that need.

We have found that the non-toxic dibasic esters of succinic, glutaric and adipic acid, either alone or in mixtures thereof, can be used successfully as the flushing solvent for cleaning residues of two component epoxy adhesives. The carboxylic acid esters useful as flushing agents in this invention include those having the formula $R(COOR')_n$ wherein R represents a hydrocarbon group having from 1 to 10 carbon atoms, R' represents an aliphatic hydrocarbon group having from 1 to 4 carbon atoms and n represents a whole number of from 1 to 2. Esters useful as epoxy adhesive flushing agents in the present invention include the methyl and ethyl esters of succinic, glutaric and adipic acids, esters of acetic, propionic, 2-ethyl hexanoic, octoic, lauric acids and the like, and mixtures thereof. Most preferred as flushing agents in this invention are mixtures of the dimethyl esters of succinic, glutaric and adipic acids in the weight percent range in the mixture of 15–25% to 55–75% to 10–25%, respectively. Such flushing agents can be used for flushing most commercially available epoxy adhesives. Using the process of this invention, the epoxy adhesive residues can be rapidly dispersed/dissolved, up to as high as 40% by weight of adhesive based on weight of ester with very little mixing efforts for up to a one-week period after use of the adhesive. Stated differently, the weight ratio of ester flushing agent to adhesive residue is preferably at least about 60:40, respectively. At a lower ratio of adhesive to ester, the solvent can be used for a longer time. When the mixed epoxy adhesive to be flushed, filled with inorganic fillers (such as talc, fumed silica, and the like) is mixed (brought in contact) with the flushing agent of this invention, the filler and the polymerized part of the adhesive are dispersed as a fine non-tacky solid in the flushing agent; and the monomeric and oligomeric organic part of the epoxy resin and the hardener go into solution in the flushing agent. The insoluble solid which is dispersed in the flushing agent can be removed by filtration or centrifugation and the liquid can be reused for dispersing/dissolving further epoxy adhesive residues.

If desired, other additive solvents such as a monohydroxy and polyhydroxy component, i.e., methanol, ethanol, isopropanol, ethylene glycol, propylene glycol, triethylene glycol, dipropylene glycol, tripropylene glycol, and the like and dimethyl formamide, n-alkyl pyrrolidone can be used in the essential ester flushing agents of this invention.

Epoxy resin adhesives, including two component epoxy resin adhesives, which can be flushed by the process of this invention include such materials as those disclosed in copending U.S. Pat. No. 4,578,424 and elsewhere in the prior art.

The process of this invention if further illustrated in the following representative examples.

EXAMPLE 1

A two component epoxy adhesive made up of an epoxy resin component (A) containing 84.5 parts by weight of liquid diglycidyl ether of Bisphenol-A (epoxy equivalent weight of about 185), 7.9 parts by weight of a carboxylic acid butadiene/acrylonitrile copolymer rubber (Hycar terminated from B. F. Goodrich Co.), 6 parts by weight of fumed silica, and 1.5 parts by weight of fumed silica, and 1.5 parts by weight of isophorone diisocyanate and the hardener component (B) was made up of 36 parts by weight of poly(propylene oxide) triprimary amine (molecular weight of about 3100) 6 parts by weight of poly(propylene oxide) diprimary amine (molecular weight of about 400), 3 parts of tris(dimethyl amino methyl)phenol, 12 parts by weight of Bisphenol-A and 33 parts by weight of talc, was mixed in 1:3 weight ratio of (A):(B). The mixed adhesive which had room temperature mixer life of about 15 minutes (before gellation occurred), was mixed with the mixed dimethyl esters of succinic acid (24% by weight) glutaric acid (62% by weight) and adipic acid (14% by weight) in amounts of (1) 10 g of adhesive in 50 g of the mixed ester, (2) 15.2 g of adhesive in 50 g of mixed ester, and 93) 20 g of adhesive in 50 g of mixed ester. All three systems were mixed rapidly for 4 minutes during which time the sticky bead of the adhesive dispersed to give white suspended solids (non-sticky). The solids were filtered, dried and weighed to give: (1) 4.8 g of solids, (2) 6.9 g of solids, and (3) 9.9 g of solids, respectively, which represent approximately 45 to 50% of the total adhesive composition in each case. The filtrates in each case were found to be clear solutions. GLC analysis of the filtrates showed no free methanol, indicating no detectable reaction of amines or other components of the adhesive mixture with the dibasic esters and demonstrating the stability of the mixed ester solvent towards the epoxy adhesive components.

EXAMPLE 2

The two components of the epoxy adhesive of Example 1 were mixed as described and dispensed in the form of a bead by a static mixer using an air-driven gear pump dispensing machine. The mixed adhesive was left idle at ambient temperature in the static mixer for 10 minutes and the mixer was then flushed and cleaned with the mixed ester solvent of Example 1 for 5 minutes. No adhesive was found to be retained in the static mixer.

EXAMPLE 3

The procedure of Example 1 was followed using an epoxy resin component composed of 71 parts by weight of liquid diglycidyl ether of Bisphenol-A, 7 parts of the Hycar rubber of Example 1, 16 parts of talc and 6 parts of fumed silica and the hardener component composed of bis(amido-amine) 32 parts by weight, obtained by the 2:1 weight ratio reaction of bis(aminopropyl)piperazine with dimerized linoleic acid, 16.6 parts by weight of poly(propylene oxide) diprimary amine (400 molecular weight) 10 parts of aminoethyl piperazine, 10 parts by weight of Bisphenol-A and 32 parts by weight of dry kaolin filler. A 10 g portion of mixed adhesive, using 1:4 to 1 weight ratio of epoxy component to hardener, was mixed with 50 g of the mixed dibasic acid esters of Example 1. Upon mixing for four minutes, the adhesive was found to disperse uniformly into the solvent. The insoluble solid was filtered and dried (6g, approximately 60% by weight of the total adhesive) and the clear filtrate was found by GLC to have no methanol, showing that there was no reaction between the adhesive components and the solvent.

EXAMPLE 4

The procedure of Example 1 was repeated using methyl trimethyl acetate, $(CH_3)_3 CCOOCH_3$, in place of the mixed dimethyl esters and similar results were obtained. The adhesive was more soluble in this solvent leaving only 2.8 g of solids (26.6%).

EXAMPLE 5

The procedure of Example 4 was repeated using methyl hexanoate in place of the methyl trimethyl acetate and similar results were obtained. The adhesive was more soluble in this solvent leaving only 2.6 g (23.9%) of solids.

We claim:

1. A process for removing mixed two component epoxy adhesives and coatings residues from apparatus, containers and other surfaces used in the preparation, dispensing of and curing of said epoxy adhesives and epoxy coatings said two components comprising an epoxy resin component and a hardener component comprising contacting said residues with a flushing agent consisting essentially of at least one ester of a carboxylic acid having the formula $R(COOR')_n$ wherein R represents a hydrocarbon group having from 1 to 10 carbon atoms, R' represents an aliphatic hydrocarbon group having from 1 to 4 carbon atoms and n represents a whole number of from 1 to 2.

2. The process of claim 1 wherein the weight ratio of flushing agent to residue is at least about 60:40, respectively.

3. The process of claim 2 wherein the flushing agent is a mixture of dimethyl succinic acid ester, dimethyl glutaric acid ester and dimethyl adipic acid ester.

4. The process of claim 2 wherein the flushing agent is methyl trimethyl acetate.

5. The process of claim 2 wherein the flushing agent is methyl hexanoate.

6. The process of claim 1 wherein the hardener component is an amine/amido amine type hardener.

* * * * *